(12) United States Patent
Acee et al.

(10) Patent No.: US 12,488,702 B2
(45) Date of Patent: Dec. 2, 2025

(54) METHOD OF AND SYSTEM FOR ONE-ENGINE-INOPERATIVE TRAINING IN AIRCRAFT WITH DISSIMILAR ENGINES

(71) Applicant: Bell Textron Inc., Fort Worth, TX (US)

(72) Inventors: Aaron Alexander Acee, Highland Village, TX (US); Timothy McClellan Mosig, Richland Hills, TX (US); Michael Seifert, Southlake, TX (US)

(73) Assignee: Textron Innovations Inc., Providence, RI (US)

( * ) Notice: Subject to any disclaimer, the term of this patent is extended or adjusted under 35 U.S.C. 154(b) by 1171 days.

(21) Appl. No.: 17/378,980

(22) Filed: Jul. 19, 2021

(65) Prior Publication Data

US 2023/0019379 A1  Jan. 19, 2023

(51) Int. Cl.

| | |
|---|---|
| *G09B 9/18* | (2006.01) |
| *B64C 27/00* | (2006.01) |
| *B64C 27/12* | (2006.01) |
| *B64D 31/12* | (2006.01) |
| *G09B 9/08* | (2006.01) |

(52) U.S. Cl.
CPC .............. *G09B 9/18* (2013.01); *B64C 27/006* (2013.01); *B64C 27/12* (2013.01); *B64D 31/12* (2013.01); *G09B 9/08* (2013.01)

(58) Field of Classification Search
CPC . G09B 9/085; G09B 9/18; G09B 9/08; G09B 9/46; B64C 27/006; B64C 27/12; B64D 31/12; B64D 35/08; G06F 30/20
USPC ............................................................ 703/8
See application file for complete search history.

(56) References Cited

U.S. PATENT DOCUMENTS

| | | | |
|---|---|---|---|
| 2011/0138817 A1* | 6/2011 | Vialle ...................... | F01D 25/22 60/39.08 |
| 2013/0203021 A1* | 8/2013 | Beaud ...................... | G09B 9/46 434/35 |
| 2015/0176488 A1* | 6/2015 | Borchers .................. | F02C 6/02 60/773 |
| 2016/0237917 A1* | 8/2016 | Marconi .................. | F02C 7/262 |
| 2017/0025032 A1* | 1/2017 | Dumar ..................... | G09B 9/44 |
| 2020/0247553 A1* | 8/2020 | Prater ...................... | B64D 35/08 |

* cited by examiner

*Primary Examiner* — John E Johansen
(74) *Attorney, Agent, or Firm* — Bradley Arant Boult Cummings LLP

(57) ABSTRACT

A method of simulating an aircraft one-engine inoperative ("OEI") event includes operating a supplemental power unit ("SPU") at a first SPU power level less than an SPU contingency power rating, operating a primary engine at a first primary-engine power level, reducing the primary-engine power level to less than the first primary-engine power level, and maintaining a sum of the primary-engine power level and the SPU power level at a power level substantially equal to the SPU contingency power rating.

17 Claims, 3 Drawing Sheets

METHOD OF AND SYSTEM FOR ONE-ENGINE-INOPERATIVE TRAINING IN AIRCRAFT WITH DISSIMILAR ENGINES

TECHNICAL FIELD

The present disclosure relates generally to one-engine-inoperative ("OEI") training and more particularly, but not by way of limitation, to OEI training in aircraft with dissimilar engines.

BACKGROUND

This section provides background information to facilitate a better understanding of the various aspects of the disclosure. It should be understood that the statements in this section of this document are to be read in this light and not as admissions of prior art.

On a single-engine aircraft, engine failure typically is simulated by cutting the engine's throttle. On twin-engine aircraft, in which two identical engines are used, failure of one of the engines typically is simulated by both engines spooling to identical reduced power outputs such that a total output power of the two engines in combination equals a contingency power of one of the two engines.

SUMMARY

This summary is provided to introduce a selection of concepts that are further described below in the detailed description. This summary is not necessarily intended to identify key or essential features of the claimed subject matter, nor is it intended to be used as an aid in limiting the scope of claimed subject matter.

A method of simulating an aircraft one-engine inoperative ("OEI") event includes operating a supplemental power unit ("SPU") at a first SPU power level less than an SPU contingency power rating, operating a primary engine at a first primary-engine power level, reducing the primary-engine power level to less than the first primary-engine power level, and maintaining a sum of the primary-engine power level and the SPU power level at a power level substantially equal to the SPU contingency power rating.

A system for simulating an aircraft one-engine inoperative ("OEI") event includes a supplemental power unit ("SPU") operable at a first SPU power level less than an SPU contingency power rating, a primary engine operable at a first primary-engine power level, and a flight control system ("FCS") that controls the SPU and the primary engine. The FCS is operable to reduce the primary-engine power level to less than the first primary-engine power level and maintain a sum of the primary-engine power level and the SPU power level at a power level substantially equal to the SPU contingency power rating.

A computer-program product includes a non-transitory computer-usable medium having computer-readable program code embodied therein. The computer-readable program code is adapted to be executed to implement a method. The method includes operating a supplemental power unit ("SPU") at a first SPU power level less than an SPU contingency power rating, operating a primary engine at a first primary-engine power level, reducing the primary-engine power level to less than the first primary-engine power level, and maintaining a sum of the primary-engine power level and the SPU power level at a power level substantially equal to the SPU contingency power rating.

BRIEF DESCRIPTION OF THE DRAWINGS

The disclosure is best understood from the following detailed description when read with the accompanying figures. It is emphasized that, in accordance with standard practice, various features may not be drawn to scale. In fact, the dimensions of various features may be arbitrarily increased or reduced for clarity of discussion.

DETAILED DESCRIPTION

Various embodiments will now be described more fully with reference to the accompanying drawings. The disclosure may, however, be embodied in many different forms and should not be construed as limited to the embodiments set forth herein.

In an multi-engine aircraft that does not employ identical engines, neither the single-engine nor the dual-identical-engine power-failure simulations described in the Background is feasible from a reliability or repeatability standpoint. Therefore, a new solution that permits one-engine-inoperative ("OEI") simulation is needed.

In a typical embodiment, the multi-engine aircraft is a helicopter that utilizes a primary engine capable, for example, of ~3,000 hp and a supplemental power unit ("SPU") capable, for example, of ~500 hp, both of which are operable to power a drivetrain of the multi-engine aircraft. In the event of a primary-engine failure (i.e., degraded performance or complete failure of the primary engine), the SPU is operable to increase its power to a pre-defined power level that is variable according to performance of the primary engine and design considerations. The pre-defined power may be as great as an SPU contingency power rating that is used in the event of a primary-engine failure.

In the event, for example, of primary-engine failure and increase by the SPU to the SPU contingency power rating in response thereto, it is likely that the SPU will be damaged. It is therefore undesirable to risk SPU damage by cycling the SPU to high power levels, such as, for example, the SPU contingency power rating, during pilot OEI training. To prevent damage to the SPU, an OEI training mode is implemented that can be used to simulate degradation of performance, up to complete failure, of the primary engine while reducing the risk of damage to the SPU.

In a typical embodiment, the SPU operates at a pre-defined power output level under normal conditions (i.e., no actual or simulated OEI condition is present) and the OEI training mode initiates by maintaining the pre-defined power level of the SPU such that a power level of the SPU is either not modulated or is modulated less than during an actual primary-engine failure. The pre-defined SPU power level under normal conditions may be a zero or non-zero power level.

A flight-control system ("FCS") of the aircraft calculates a difference between the SPU contingency power rating and the pre-defined SPU power level. The primary engine then spools down and outputs a difference in power between the SPU power level and the SPU contingency power rating in order to simulate the aircraft operating at the SPU contingency power rating.

Figure 1:
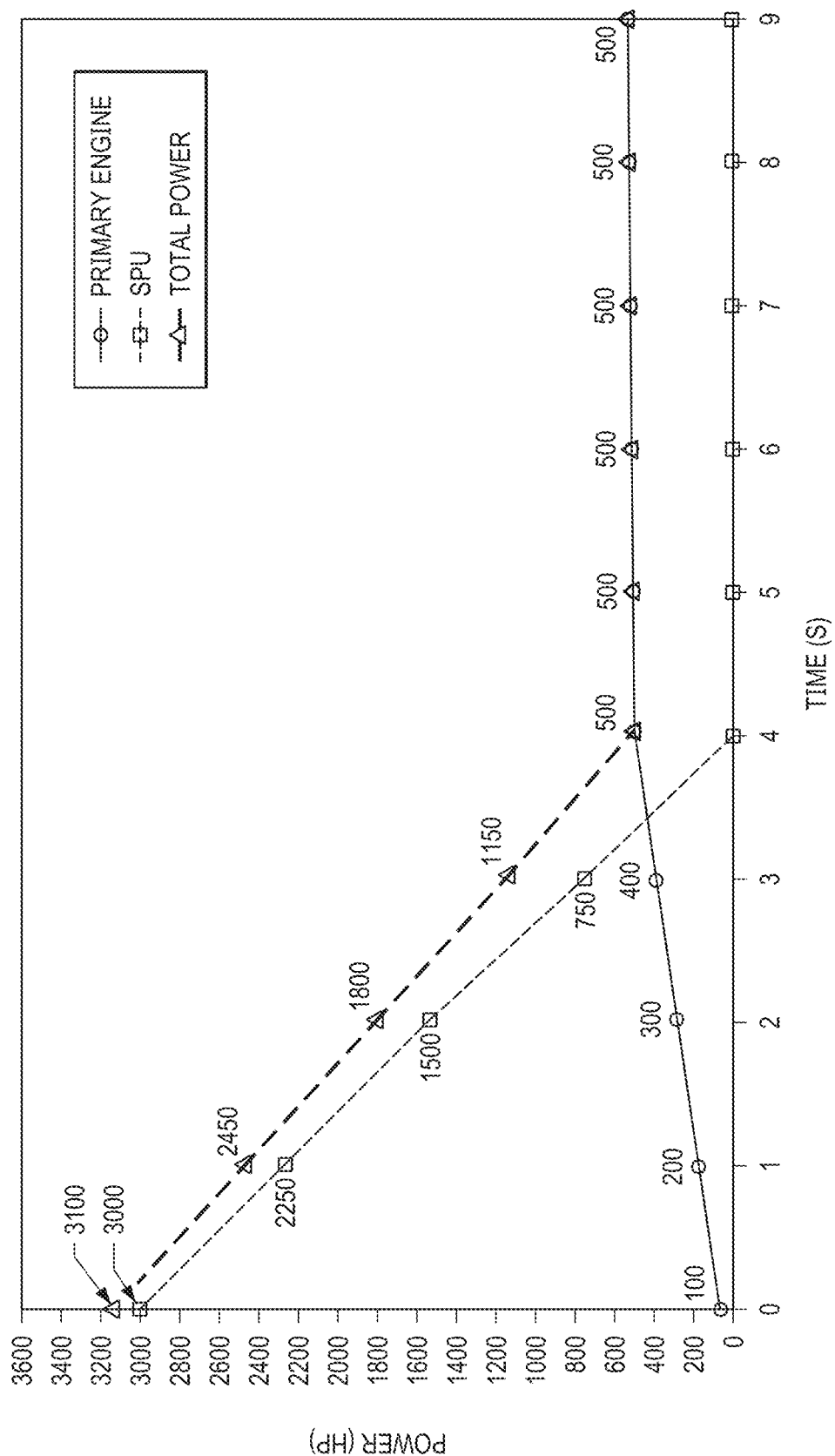
FIG. 1 is a graph that illustrates power as a function of time during a one-engine-inoperative event.

FIG. 1 is a graph that illustrates power as a function of time during an OEI event. Some aircraft use two very different engines. In the example shown in FIG. 1, a primary engine is capable of providing about 3,000 hp and a supplemental power unit ("SPU") is capable of producing about 500 hp. For a majority of flight conditions, the aircraft will only need the primary-engine and, under certain high-power-demand flight conditions, the SPU provides additional power to the aircraft for improved performance.

One of the benefits of the SPU is that, in the event of a failure of the primary engine, the SPU provides additional power in the event of primary-engine degraded performance or outright primary-engine failure. Various embodiments utilize an automatic control such that, after a flight control system ("FCS") of the aircraft detects a primary-engine failure (i.e., outright primary-engine failure or degrade performance), the SPU is powered up, for example, to a power level to provide maximal performance, for example, to assist in autorotation of the aircraft in such an emergency situation.

In FIG. 1, at time 0 s, the primary engine is operating at 3,000 hp and the SPU is operating at 100 hp. Thus, total power output of the primary engine and the SPU in combination is 3,100 hp. After time 0 s, primary-engine failure occurs such that at time 4 s, the primary engine is supplying no power to the aircraft. Although the primary-engine failure illustrated by FIG. 1 shows a linear decrease in power during a period of 4 seconds, those having skill in the art will appreciate that a primary-engine failure will not necessarily be such that power supplied by the primary engine decreases in a linear manner or decreases on the way to zero.

At time 0 s, the SPU is operating at 100 hp, such that the SPU is supplying a relative nominal amount of power relative to the total power of 3,100 hp. In response to detection by the FCS of primary-engine failure after time 0 s, the SPU is directed to increases its power up to 500 hp over 4 s, such that total power supplied to the aircraft is 500 hp at 4 s. In the example shown in FIG. 1, the SPU contingency power rating is 500 hp, which means that SPU should be operated at this power level only in the event of an emergency such as a primary-engine failure. The 500 hp power level of the SPU shown in FIG. 1 is a power level that will in most situations require that the SPU be inspected and overhauled. The operational and OEI power levels illustrated herein are only for illustrative purposes and can vary without departing from the principles disclosed herein.

In contrast to the above, when a primary-engine failure is being simulated on a prototype aircraft or if pilots are being trained on procedures to follow in the event of a primary-engine failure, it is not desirable for the SPU to operate at such a high power level (e.g., 500 hp) because such high power levels can damage the SPU.

In an OEI training mode, the SPU can freeze at its current power level when the training mode is initiated or can be adjusted to a level that is not damaging to the SPU (e.g., ~400 hp). In the OEI training mode, a power level of the primary engine is decreased so that the total power provided to the aircraft is the same as an expected power level (e.g., of the SPU operating alone) in an emergency situation such as a primary-engine failure.

In some embodiments, the SPU power level is not frozen at its current power but is instead adjusted to some other non-damaging power level. In a typical embodiment, the SPU is operated at power level that would not be expected to damage the SPU. The primary engine is operated at a power level such that the pilot and aircraft experience the same amount of power that would be expected in a real-world emergency event.

Figure 2:
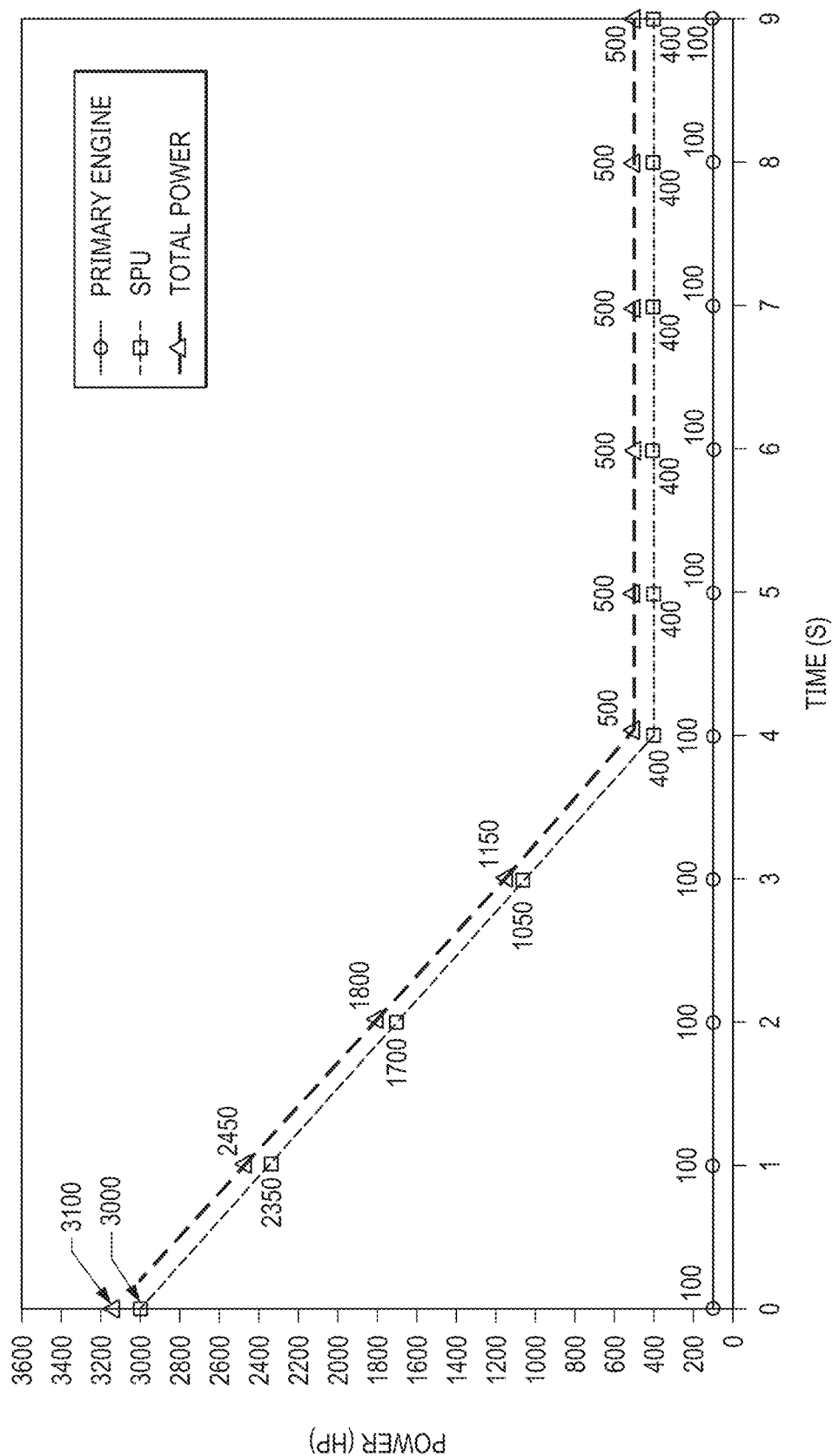
FIG. 2 is a graph that illustrates power as a function of time during a simulated one-engine-inoperative event.

FIG. 2 is a graph that illustrates power as a function of time during a simulated OEI event. In similar fashion to FIG. 1, in FIG. 2 the primary engine is operating at 3,000 hp and the SPU is operating at 100 hp under normal conditions. In order to simulate a primary-engine failure in which the primary engine experiences a total failure over a period of 4 s as in FIG. 1, power output of the primary engine is decreased from 3,000 hp to 400 hp from 0 s to 4 s.

As a result, the total power output of FIG. 2 is identical to that shown in FIG. 1, but the power output of the SPU does not exceed 100 hp which, in this example, is not sufficiently high to cause damage to the SPU. Thus, for example, a pilot undergoing OEI training would experience the same power as the OEI event illustrated in FIG. 1 and the SPU would not need to be inspected or overhauled as could be the case if the SPU were operated at a potentially damaging power level.

Figure 3:
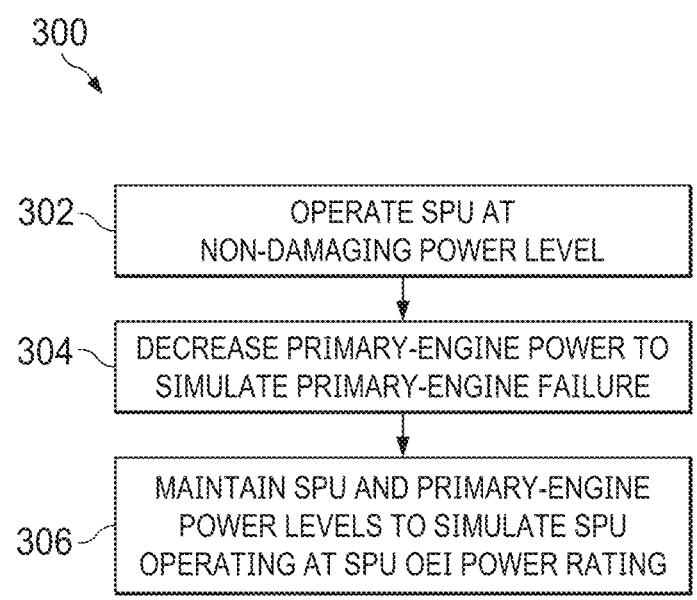
FIG. 3 is a flow chart that illustrates a process for one-engine-inoperative training.

FIG. 3 is a flow chart that illustrates a process for OEI training. In FIG. 3, a process flow 300 is shown. The process 300 begins at step 302, at which step the SPU is operated at a non-damaging power level (e.g., 400 hp). As noted above, the SPU can have its power frozen at a power level at which it was operating under normal (i.e., non-OEI) conditions or it can be increased or decreased to another non-damaging power level in accordance with design considerations. From step 302, execution proceeds to step 304.

At step 304, a power level of the primary engine is decreased in order to simulate a primary-engine failure. As noted above, a primary-engine failure can be either a total failure of the primary engine or degraded performance of the primary engine. From step 304, execution proceeds to step 306.

At step 306, the power levels of the SPU and the primary engine are maintained at a level that simulates the SPU operating at the SPU contingency power rating. For example, as shown in FIGS. 1 and 2, the SPU may be operated at a power level of 100 hp and the primary engine operated at a power level of 400 hp in order to simulate the SPU contingency power rating of 500 hp. Thus, the aircraft is operated with a total engine power output of 500 hp in order to allow, for example, a pilot to train under OEI conditions without risking damage to the SPU due to operating it at high power levels.

For purposes of this patent application, the term computer-readable storage medium encompasses one or more tangible computer-readable storage media possessing structures. As an example and not by way of limitation, a computer-readable storage medium may include a semiconductor-based or other integrated circuit (IC) (such as, for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements RAM or ROM. In particular embodiments, a computer-readable storage medium implements volatile or persistent memory. In particular embodiments, one or more computer-readable storage media embody encoded software.

In this patent application, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Python, Java, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within 10% of" what is specified.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method of simulating a one-engine inoperative ("OEI") event in a multi-engine aircraft that does not employ identical engines, the method comprising:
    operating a supplemental power unit ("SPU") at a first SPU power level less than an SPU contingency power rating, wherein the SPU contingency power rating is a power level after which the SPU must be inspected to assess a need for an overhaul of the SPU;
    operating a primary engine at a first primary-engine power level;
    simulating the OEI inoperative event by reducing the primary-engine power level to less than the first primary-engine power level; and
    maintaining a sum of the primary-engine power level and the SPU power level at a power level substantially equal to the SPU contingency power rating.

2. The method of claim 1, wherein the first SPU power level is a power level at which the SPU can be operated continuously without damage.

3. The method of claim 1, wherein the first SPU power level is a non-zero power level.

4. The method of claim 1, wherein the first SPU power level is zero.

5. The method of claim 1, comprising operating the SPU at a second SPU power level greater than the first SPU power level and less than the SPU contingency power rating.

6. The method of claim 1, comprising operating the SPU at a second SPU power level less than the first SPU power level.

7. A system for simulating an aircraft one-engine inoperative ("OEI") event in a multi-engine aircraft that does not employ identical engines, the system comprising:
    a supplemental power unit ("SPU") operable at a first SPU power level less than an SPU contingency power rating, wherein the SPU contingency power rating is a power level after which the SPU must be inspected to assess a need for an overhaul of the SPU;
    a primary engine operable at a first primary-engine power level;
    a flight control system ("FCS") that controls the SPU and the primary engine, wherein the FCS is operable to:
        simulate the OEI inoperative event by reducing the primary-engine power level to less than the first primary-engine power level; and
        maintain a sum of the primary-engine power level and the SPU power level at a power level substantially equal to the SPU contingency power rating.

8. The system of claim 7, wherein the first SPU power level is a power level at which the SPU can be operated continuously without damage.

9. The system of claim 7, wherein the first SPU power level is a non-zero power level.

10. The system of claim 7, wherein the first SPU power level is zero.

11. The system of claim 7, wherein the SPU is operable at a second SPU power level greater than the first SPU power level and less than the SPU contingency power rating.

12. The system of claim 7, wherein the SPU is operable at a second SPU power level less than the first SPU power level.

13. A computer-program product comprising a non-transitory computer-usable medium having computer-readable program code embodied therein, the computer-readable program code adapted to be executed to implement a method comprising:

operating a supplemental power unit ("SPU") of a multi-engine aircraft that does not employ identical engines at a first SPU power level less than an SPU contingency power rating, wherein the SPU contingency power rating is a power level after which the SPU must be inspected to assess a need for an overhaul of the SPU;

operating a primary engine of the multi-engine aircraft at a first primary-engine power level;

simulating the OEI inoperative event by reducing the primary-engine power level to less than the first primary-engine power level; and maintaining a sum of the primary-engine power level and the SPU power level at a power level substantially equal to the SPU contingency power rating.

14. The computer-program product of claim 13, wherein the first SPU power level is a power level at which the SPU can be operated continuously without damage.

15. The computer-program product of claim 13, wherein the first SPU power level is a non-zero power level.

16. The computer-program product of claim 13, wherein the first SPU power level is zero.

17. The computer-program product of claim 13, the method comprising operating the SPU at a second SPU power level greater than the first SPU power level and less than the SPU contingency power rating.

\* \* \* \* \*